Oct. 18, 1966  A. A. BERNARD ETAL  3,279,669
ELECTRODE GUIDE MEANS
Filed July 7, 1964  2 Sheets-Sheet 1
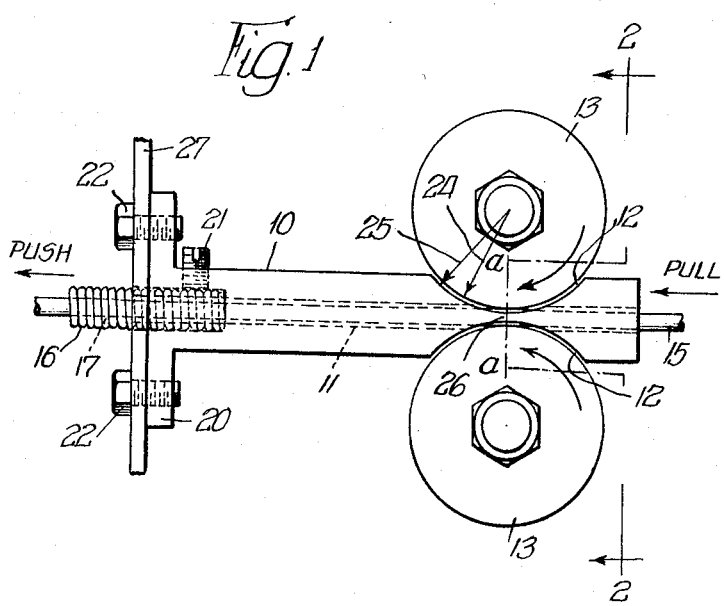
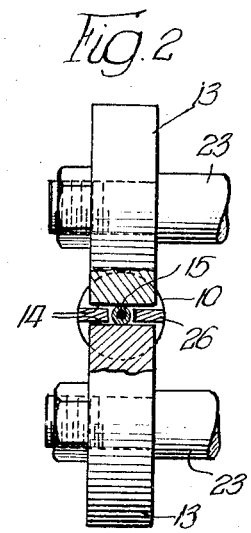
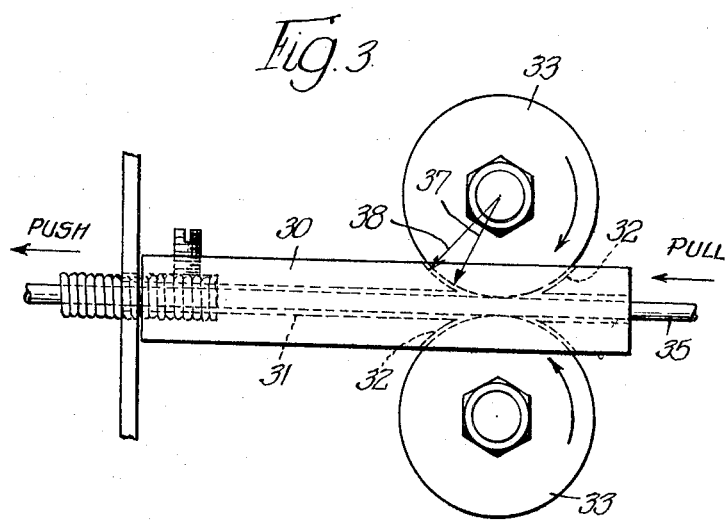
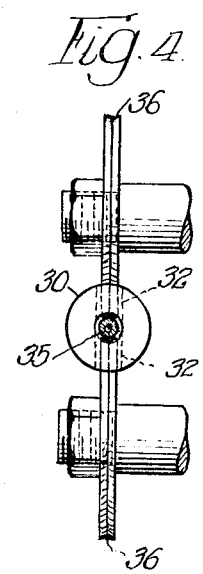
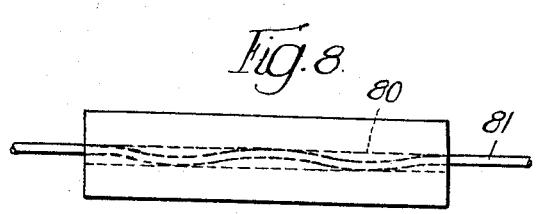
INVENTORS
Arthur A. Bernard,
BY Richard A. Bernard,
Hume, Groen, Clement + Hume.
ATTYS

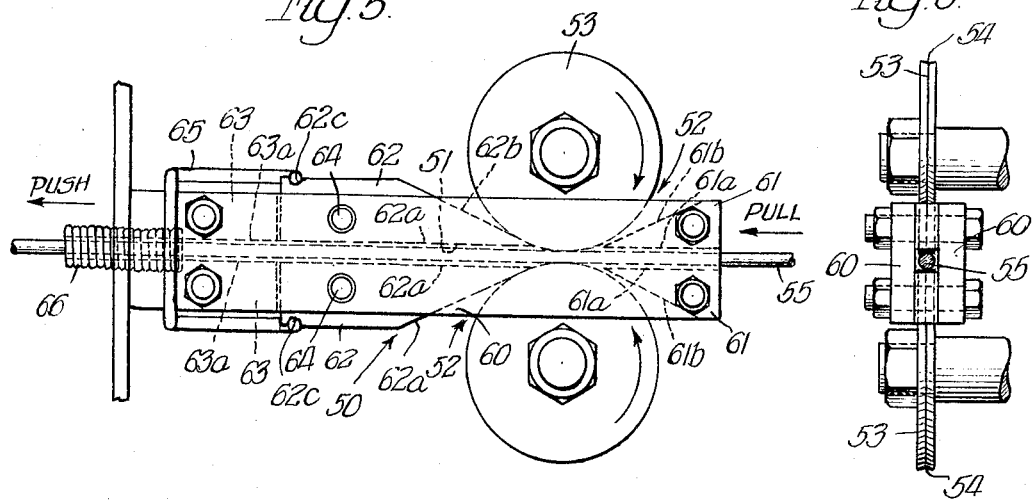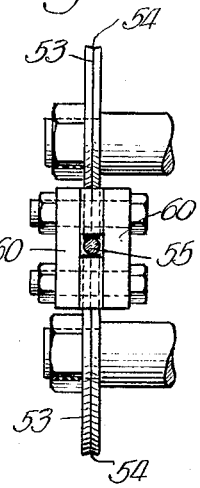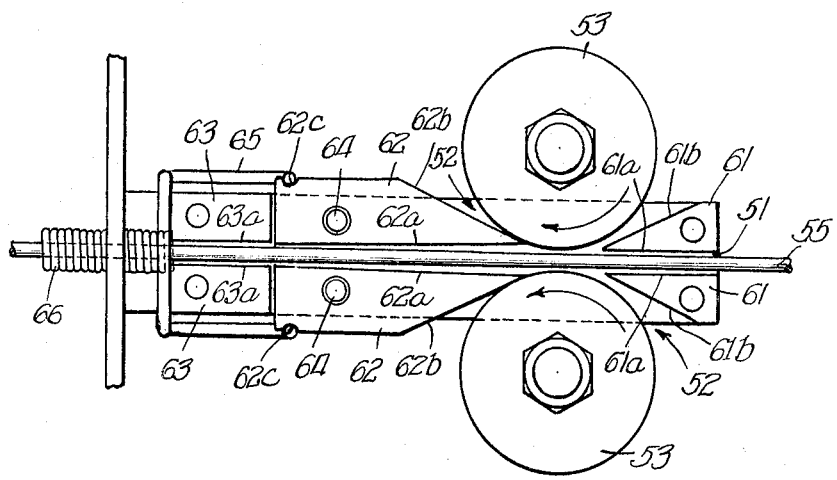

United States Patent Office 3,279,669
Patented Oct. 18, 1966

3,279,669
ELECTRODE GUIDE MEANS
Arthur A. Bernard and Richard A. Bernard, Chicago Heights, Ill., assignors to Bernard Welding Equipment Company, Beecher, Ill., a corporation of Illinois
Filed July 7, 1964, Ser. No. 380,745
7 Claims. (Cl. 226—181)

This invention relates to arc welding machines of the continuous-feed type in which consumable wire electrode is withdrawn from a source and pushed through a flexible conduit to the welding arc by one or more power-driven pairs of feed rolls. More particularly, this invention relates to a method for guiding consumable electrode through the feed rolls and into the flexible conduit and to unique means for implementing this method.

In conventional semi-automatic arc welding machines, consumable wire electrode is withdrawn from a reel and pushed through a flexible conduit to a hand-manipulated welding gun. The consumable wire electrode is fed to the welding arc continuously from the nozzle of the gun, and deposition of the electrode metal occurs as the gun is manually directed along the welding course. In order to provide the requisite flexibility for manipulating the welding gun, the gun is separated from a housing containing the electrode feed apparatus by a finite length of the flexible conduit through which the electrode is pushed. As generally known by persons familiar with the art, the maximum length of flexible conduit through which the consumable electrode can be pushed by an existing electrode feed apparatus is approximately 15 feet. If a greater length of flexible conduit is attempted with existing electrode feed apparatus, the user is confronted with the problem of disruptive buckling or kinking of the electrode in the area in which it exits from the feed rolls as the push-feed force is exerted on it by the feed rolls. This buckling and kinking phenomenon and the consequent limitation it imposes on the length of the flexible conduit is described at pages 29.36 and 29.37 of the American Welding Society Welding Handbook, fifth edition, 1963.

The 15-foot limitation on the length of the flexible conduit imposed by the buckling and kinking phenomenon is a decided disadvantage in conventional semi-automatic arc welding machines, which severely restricts the utility of such machines. Obviously, if the flexible conduit between the electrode feed apparatus and the welding gun could exceed the existing maximum length of 15 feet so as to extend, for example, 25 or 30 feet, the area in which the welding operation could be conducted without the necessity of moving the electrode feed apparatus would be greatly enlarged. Moreover, welding operations could be conducted under circumstances which do not presently permit semi-automatic welding because of the length limitation of the flexible conduit. For example, with longer lengths of flexible conduit, semi-automatic welding operations could be conducted in large tanks and other such vessels where the present limitation on flexible conduit length requires that the welding be accomplished with slower speed stick-electrode welding.

It should be understood at the outset that the electrode buckling and kinking phenomenon referred to is inherent in the conventional method for guiding the electrode through the feed rolls and into the flexible conduit. The conventional electrode guide means comprises two guide tubes mounted on opposite sides of the feed rolls. One guide tube is used to guide the electrode into the feed rolls, and a second, separate guide tube is used to guide the electrode from the feed rolls into the flexible conduit. The ends of these two guide tubes are distinctly separated by, and spaced from, the feed rolls. Hence, the electrode must pass through an area as it exits from the feed rolls in which it is neither supported nor otherwise restrained against undesired movement transversely of the direction of feed. It is significant that the force required to push the electrode through the flexible conduit to the welding arc can vary from a few pounds up to 50 pounds or more, and is largely determined by the number of friction producing turns and bends developed in the flexible conduit as the gun is manipulated during the welding operation. When this force exceeds a certain limit, the electrode buckles or kinks in the unsupported and unrestrained area referred to, completely stopping the electrode feeding action. With electrodes in the sizes of .045, .035 and .030 inch diameter, which because of their small diameter have very little columnar strength, the buckling and kinking problem is exceptionally serious, and it is the smaller sizes of electrode referred to which are commonly used to produce the high current density arcs which have proved in recent years to be the most efficient. Indeed, with these small diameters, even though the end of the conventional guide tube is very close to the area in which the electrode leaves the feed rolls, the electrode will nevertheless buckle when the friction in the flexible conduit reaches a certain level since the electrode is free to, and in fact does, assume a direction between the electrode contacting surfaces of the feed rolls themselves which is transverse to the direction of feed. Accordingly, it is important to understand that the buckling and kinking action results not only from a failure of the conventional guide means to support and transversely restrain the movement of the electrode in the area in which the electrode leaves the feed rolls but also from the failure of the conventional guide means to retrain transverse movement of the electrode between the traction surfaces of the feed rolls themselves.

Considering briefly some further implications of the electrode buckling and kinking phenomenon, it should be noted that it is not uncommon to find the electrode buckling or kinking with conventional guide means as much as two or three times an hour. Each time this occurs it requires several minutes to correct the condition. Moreover, each time the buckling or kinking occurs as much as 15 feet of electrode must be scrapped since correction of the buckled or kinked condition requires cutting the electrode on each side of the feed rolls to remove the buckled portion, withdrawing and discarding the electrode from the flexible conduit, and then rethreading the electrode feed apparatus.

In addition, the buckling and kinking problem is a major cause of non-uniform welding results. Obviously, the welding operator attempts to prevent the electrode from buckling or kinking by keeping the flexible conduit in as straight a line as possible in order to minimize the push-feed force required to overcome friction conditions introduced by curves and bends in the flexible conduit. This, of course, is a source of irritation to the welding operator as well as a limitation on the utility of the welding machine. It is also rather common practice with welding operators to reduce the spring force which biases the rotating feed rolls into driving engagement with the electrode, again in order to minimize the force pushing the electrode through the flexible conduit. But the latter practice reduces the efficiency of traction between the feed rolls and the electrode with the result that the feed rolls tend to slip on the surface of the electrode when the force required to push the electrode through the flexible conduit exceeds a certain limit. Since the push force is constantly changing because of the constant change in the configuration of the curves and bends in the flexible conduit during the welding operation, the electrode feed rate accordingly becomes undesirably non-uniform because of the slippage between feed rolls and the electrode.

It should be noted at this juncture that while the instant invention is particularly suited for use with semi-automatic arc welding machines in which the problem of buckling and kinking is most pronounced, the invention is equally valuable for use with fully automatic arc welding machines.

It is a primary object of this invention to eliminate electrode kinking and buckling in continuous feed arc welding machines, both in the area in which the electrode leaves the feed rolls and between the electrode contracting surfaces of the feed rolls themselves.

It is another primary object of this invention to make possible the use of a much greater length of flexible conduit between the electrode feed apparatus and the welding gun in an arc welding machine, thereby extending the effective area in which welding operations may be conducted without the necessity of moving the housing containing the electrode feed apparatus.

Still another important object of this invention is to adapt electrode feed apparatus to self-threading operation. In this connection, it should be appreciated that, with all present forms of electrode feed apparatus, the rethreading of each new coil of wire electrode is a costly, time consuming operation. The common procedure is to guide the starting of electrode into proper orientation in the feed rolls with a long-nosed pair of pliers or other tool. Traction force is then lightly applied to conduct the electrode slowly through the feed rolls while simultaneously guiding the starting end of the electrode into the second guide tube with the long-nosed pliers. The present invention eliminates this cumbersome procedure.

Other objects and advantages of this invention will be made apparent in the complete description of the invention which follows and by the accompanying drawings in which:

FIGURE 1 is a side view in elevation of one preferred embodiment of the invention.

FIGURE 2 is a cross-sectional view taken at 2—2 of FIGURE 1.

FIGURE 3 is a side view in elevation of another preferred embodiment of the invention.

FIGURE 4 is an end view of the embodiment of FIGURE 3.

FIGURE 5 is a side view in elevation of a further preferred embodiment of the invention with the feed rolls in drive position.

FIGURE 6 is an end view of the embodiment shown in FIGURE 5.

FIGURE 7 is a side view in elevation of the embodiment of FIGURE 5 with the feed rolls in the withdrawn position and with one side plate removed to better illustrate the continuing contact of the spring-loaded pivotal members with the feed rolls.

FIGURE 8 is a side elevation view of the wire being pushed through the continuous bore.

This invention eliminates the problem of electrode buckling and kinking by continuously guiding the electrode as it passes through the feed rolls and from the feed rolls into the flexible conduit. Specifically, as the electrode travels through the feed rolls to the flexible conduit, it is supported and contained in all directions transverse to the direction of feed. The feed rolls themselves provide a portion of this support and containment by virtue of their motive engagement with the electrode. To accomplish this method of continuously guiding the electrode, unique guide means are provided which cooperate with the feed rolls to form an effectively continuous bore extending from the point of entry of the electrode into the feed rolls through the feed rolls to the flexible conduit so that the electrode is continuously supported and restrained against disruptive movement transverse to the direction of feed as it passes through the feed rolls and on into the flexible conduit. As set forth more specifically in the following description, the guide means may take the form of an integral unit or an assembly of separate parts affixed to one another. In every case, however, the guide means is characteristically provided with opposed recesses adapted to receive the pair of opposed feed rolls such that the contacting surfaces of the feed rolls form a portion of the continuous bore. It is a further significant characteristic of this invention in its various forms that by virtue of the provision of a continuous bore, a passage is provided which guides the electrode into the feed rolls, through the feed rolls, and into the flexible conduit without any intervening obstacles, thereby adapting the electrode feeding means for self-threading operation. The electrode is merely inserted into the end of the continuous bore on the entrance side of the feed rolls until it is engaged by the contacting surfaces of the feed roll. From that point, the feed rolls push the electrode into and through the flexible conduit without the necessity for any further manual guiding or threading of the electrode.

Referring now to FIGURES 1 and 2 there is shown an embodiment of the invention in which a main portion of the electrode guide means comprises an elongate, tubular guide member 10 provided with a central axial bore 11 and a pair of opposed, inwardly arcuate recesses 12 having a common axis of symmetry $a$—$a$ which is located transversely of the tubular member 10 and co-planar with the axes of the feed rolls. The arcuate recesses 12 each intersect the central bore 11 and receive one of the feed rolls 13, such that the opposed traction surfaces 14 of the feed rolls engage the electrode 15 for driving, as best illustrated in FIGURE 2. At one end the guide member 10 is adapted to receive flexible conduit 16 so that the bore 17 of the conduit 16 is co-axially aligned for a portion of its length with the bore 11 of the guide member. The flexible conduit 16 is secured in the guide member 10 by means of a set screw 21. At the same end, the guide member 10 is provided with a flange 20 which is secured to the casing or housing 27 of the electrode feed apparatus by means of the screws 22.

The feed rolls 13 are mounted for rotation on respective shafts 23. Generally, the shafts 23 are coupled to the electrode feed motor (not shown) such that said both feed rolls 13 are power driven. In some instances, howeveh, only one of the feed rolls is power driven, with the other functioning as a non-powered idler, as in certain conventional electrode feed apparatus. Preferably the radius 24 of the respective feed rolls 13 should be larger than conventional in order to provide larger areas of traction between the surface of the electrode 15 and the traction surfaces 14 of the feed rolls. The preferred radius 24 for the feed rolls is approximately one inch for handling all sizes of electrode in general use. It is important to the successful operation of the invention that the radius 25 of the arcuate recesses 12 be slightly larger than the radius 24 of the feed rolls so that the feed rolls 13 can rotate without serious friction. With the guide member 10 properly positioned, the arcuate recesses 12 will be substantially concentric with the respective feed rolls 13. In addition, the thickness of the portions 26 of the guide member 10 located between the feed rolls 13 should be less than the diameter of the electrode 15 so as not to interfere with the efficiency of traction between the feed rolls 13 and the surface of the electrode 15.

At this point, it should be noted that the diameter of the bore 11 through the guide member 10 may be as small as 1¼ times diameter of the electrode 15, but preferably should not be larger than twice the diameter of the electrode 15 if electrode buckling or kinking is to be completely eliminated. As a general design guide, the outside diameter of the guide member 10 is preferably approximately equal to the thickness of the feed rolls 13 and can be of any dimension from a ¼ inch to one inch depending on the size of the electrode to be fed. It should also be noted that, although shown as an integral tubular member, the guide member 10 may comprise an assembly of two or more parts and may be of square or other cross-sectional configuration.

In operation, the arcuate recesses 12 permit the traction surfaces 14 of the feed rolls 13 to engage the electrode and exert the requisite push-feed force on it while the bore 11 of guide member 10 in conjunction with the feed rolls 13 continuously guides the electrode 15 as it passes through the feed rolls 13 and into the flexible conduit 16. The point of significance is that the guide member 10 cooperates with the feed rolls 13 to define an effectively continuous bore or passageway with no gaps sufficient to permit buckling, kinking, or folding of the elecrtode as it travels through the feed rolls 13, and into the flexible conduit 16. The traction surfaces 14 of the feed rolls 13 actually form a portion of the continuous bore.

Referring now to FIGURES 3 and 4 there is shown another preferred embodiment of the invention which, like the embodiment of FIGURES 1 and 2, incorporates the basic inventive characteristic of providing an effectively continuous bore which extends to the flexible conduit from the point of entry of the electrode into the feed rolls. The primary difference between the two embodiments is that the arcuate recesses 32 in the instant embodiment are in the form of slots milled in the sidewalls of the tubular guide member 30. The recesses 32 have approximately the same dimension in width as the diameter of the bore 31 extending axially through the center of the guide member 30, and the axial width or thickness of the feed rolls 33 is substantially the same dimension as the diameter of the electrode 35. The traction surfaces 34 of the feed rolls 33 are in the configuration of an annular V-groove in order to maintain the electrode 35 centrally located between the feed rolls. This particular structural arrangement provides two distinct advantages over the foregoing embodiment. First, the sidewalls of the slotted recesses 32 overlap the sides of the feed rolls 33. Accordingly, the guide member 30 is free to float, and need not be rigidly mounted to the casing of the electrode feed apparatus as in FIGURE 1 since its location in relation to the feed rolls is maintained by the feed rolls themselves. When the guide member is rigidly mounted, it must also be precisely positioned to insure proper alignment with the feed rolls. By permitting the guide member to freely float with the feed rolls themselvse maintaining the guide member in proper alignment, the requirement for precision mounting of the guide member is obviated. The second advantage of the FIGURE 3 embodiment is that the cross-sectional structural area of the member 30 adjacent the feed rolls 33 is much greater than the corresponding cross-sectional structural area of the guide member 10 in FIGURE 1. Consequently, the guide member 30 in FIGURE 3 is appreciably stronger and more rigid.

As in the preceding embodiment, the radius 37 of the feed rolls 13 is preferably about one inch, and the radius 38 of the arcuate, slotted recesses 32 is slightly greater than the radius 37 of the feed rolls. The recesses 32 sufficiently intersect and communicate with the bore 31 to allow full driving engagement of the electrode 55 by the feed rolls 53. As in FIGURE 1 embodiment the integral guide member 30 may alternatively comprise an assembly of two or more parts rigidly connected, and the cross-sectional configuration of the guide member 30 may, if desired, be square or of other cross-sectional shape instead of circular. The significant requirement is that the guide member 30 be adapted to cooperate with the feed rolls 33 to define an effectively continuous bore through the feed rolls 33 and to the flexible conduit, leaving no area in which the electrode can buckle or kink. Again, the feed rolls 33 form a portion of the continuous bore.

Turning now to FIGURES 5, 6 and 7, a further preferred embodiment of the invention is illustrated in which the feed rolls are not the type which rotate only during the welding operation, but rather the type which rotate continuously. To effect feed of the electrode 55, the rotating feed rolls 53 are brought toward one another into contact with the electrode 55 by appropriate means (not shown) in order to apply the necessary traction. To interrupt the feeding of the electrode 55, the feed rolls 53 are simply withdrawn from engagement with the electrode 55.

The guide means, generally denoted by the numeral 50 in this embodiment, comprises a number of parts secured together to provide an effectively continuous bore extending, as in the previous embodiments, from a point on the electrode source side of the feed rolls through the feed rolls and to flexible conduit. The guide means 50 is rectangular in cross-section with the continuous bore 51 being substantially square in cross-sectional configuration.

The guide means 50 includes a pair of opposed side members 60 between which are mounted opposed pairs of spacer members 61 and 63 and an opposed pair of pivotal members 62. The spacer members 61 are rigidly affixed between the side members 60 in an opposed relationship on the electrode entrance side of the feed rolls 53. The pivotal members 62 are mounted on respective pivots 64 between the plate members 60 immediately on the electrode exit side of the feed rolls 53. Finally, the spacer members 63 are rigidly affixed between the side plates 60 and adjacent the flexible conduit 64. The spacer members 63 are adapted to securely engage the flexible conduit 66.

In the structural configuration of this embodiment, the side plates 60 form two opposite sides of the continuous square-shaped bore 51 while the serial arrangement of the opposed edges 61a of the spacer members 61, the opposed traction surfaces 54 of the feed rolls 53, the opposed edges 62a of the pivotal members 62, and the opposed edges 63a of the spacer members 63 form the other two opposite sides of the continuous, square-shaped bore 51.

The side plates 60 overlap each feed roll 53 in part. Hence, the axial width or thickness of the feed rolls 53 is slightly less than the thickness of the spacer members 61 and 63 in order to permit the feed rolls 53 to rotate unimpaired by any serious frictional contact with the side plates 60. The annular traction surfaces 54 of the feed rolls 53 are preferably V-shaped or U-shaped to maintain the electrode 55 centrally located as it passes between the feed rolls 53.

The spacer members 61 and 62 are provided with inclined edges 61b and 62b which cooperate to form a pair of substantially arcuate recesses 52 to accommodate the feed rolls 53 and permit the feed rolls 53 to engage and drive the electrode 55. A spring member 65 engages the recesses 62c in the pivotal members 62 on the opposite side of the pivots 64 from the feed rolls 53 so as to bias the edges 62b into continuous engagement with the feed rolls 53 at the areas in which the edges 62b converge with and meet the edges 61b. The thickness of the pivotal members 62 is also slightly less than the thickness of the spacer members 61 and 63 so that the pivotal members 62 are able readily to rock on their associated pivots 64.

Thus, the edges 61b of the pivotal members 62 are continually spring-biased into contiguity with the respective traction surfaces 54 of the feed rolls so as to cooperate with traction surfaces in defining opposed peripheral or side portions of the continuous bore over a portion of the length of the continuous bore, regardless of whether the feed rolls are in positive driving engagement with the electrode 55 or whether they are withdrawn from engagement with the electrode 55 so as to interrupt the feeding action. Accordingly, a point of singular significance in this embodiment is that the possibility of any undesired gap or opening between the feed rolls 53 and the pivotal members 62 is completely foreclosed regardless of whether the feed rolls 53 are in motive engagement with the electrode 55 or in their retracted position. For this reason, the embodiment of FIGURES 5 through 7 is particularly adaptive to the constant-rotation mode of feed roll operation previously referred to.

It should be noted that, like the embodiment of FIG-

URES 3 and 4, the embodiment illustrated in FIGURES 5 through 7 does not require the guide means 50 to be rigidly and precisely anchored or attached to the electrode feed apparatus. The proper location of the guide means 50 vertically and horizontally in relation to the feed rolls 53 is maintained by allowing the guide means 50 to ride the feed rolls.

It can now be appreciated that the present invention in its various forms, provides an effectively continuous bore extending through the feed rolls to the flexible conduit. It is preferably in each embodiment that the diameter or height and width of this continuous bore be no greater than twice the diameter of the electrode. The reason for this is illustrated in FIGURE 8 in which the diameter of the bore 80 is approximately twice the diameter of the electrode 81. As depicted in FIGURE 8, when the electrode 81 is subject to the push-feed compression force of the type applied to it by the feed rolls, there is just not sufficient space within the bore 80 for the electrode 81 to buckle, fold, or become disruptively kinked. It should be noted, however, that this preferred bore diameter to electrode diameter ratio of less than two to one is not a limiting factor regarding this invention since even with a larger ratio this invention is useful and valuable.

To retard wear and prolong life the feed rolls or in the parts of the guide means in the embodiment shown in FIGURES 1 through 7 are preferably fabricated of tool steel and hardened to 58–62 Rockwell "C."

Although certain specific embodiments have been used in illustrating the invention along with specific terminology, it is to be understood that this is merely by way of example and in no manner is to be construed as a limitation. It is contemplated that certain modifications may be made within the scope of the claims without departing from the spirit of the invention.

What is claimed is:

1. In an arc welding machine in which consumable wire electrode is withdrawn from a source and pushed through a conduit to the welding arc by at least one power-driven pair of feed rolls having opposed traction surfaces, the combination with said feed rolls of guide means cooperating with said feed rolls to form a continuous bore extending through said feed rolls to said conduit, said guide means comprising,
   (a) a pair of side members having opposed surfaces forming two opposite sides of said continuous bore;
   (b) a first pair of spacer members rigidly affixed between said plate members on the entrance side of said feed rolls and having opposed edges;
   (c) a pair of spring-loaded members pivotally affixed between said pair of side members adjacent the exit side of said pair of feed rolls and having opposed edges spring-biased into contiguity with respective ones of said traction surfaces of said feed rolls; and
   (d) a second pair of spacer members adjoining said pair of spring-loaded members and rigidly affixed between said side members, said second pair of spacer members also having opposed edges; said opposed edges of said first pair of spacer members, said traction surfaces of said pair of feed rolls, said opposed edges of said pair of spring-loaded members, and said opposed edges of said second pair of spacer members serially cooperating to form the remainder of said continuous bore.

2. An arc welding machine in which consumable wire electrode is withdrawn from a source and pushed through a conduit to the welding arc by a power-driven pair of opposed feed rolls, the combination with said pair of feed rolls of elongate member having a longitudinal bore and a pair of opposed, substantially arcuate recesses intersecting said longitudinal bore, said recesses being adapted to accommodate said feed rolls so as to permit said feed rolls to engage and drive said electrode, said feed rolls cooperating with said longitudinal bore of said elongate member to define an effectively continuous bore extending from a point on the entrance side of said feed rolls, through said feed rolls and into said conduit, whereby buckling and kinking of said electrode between said feed rolls and in the space between said feed rolls and said conduit is prevented.

3. The combination defined in claim 2 wherein the effective diameter of said continuous bore is no greater than twice the diameter of the electrode.

4. The combination defined in claim 2 wherein said recesses are in the form of inwardly-arcuate slots, such that said feed rolls are overlapped in part by said recesses, whereby the location of said elongate member in relation to said feed rolls is maintained by allowing said elongate member to ride said feed rolls.

5. In an arc welding machine in which consumable wire electrode is withdrawn from a source and pushed through a conduit to the welding arc by at least one power-driven pair of feed rolls having opposed traction surfaces, the combination with said pair of feed rolls of guide means cooperating with said feed rolls to form an effectively continuous bore to guide said electrode into and through said feed rolls to said conduit, said guide means including a pair of spring-loaded members pivotally mounted in said guide means adjacent the exit from said pair of feed rolls and having opposed edges biased into contiguity with respective ones of said opposed traction surfaces of said feed rolls so as to cooperate with said traction surfaces of said feed rolls in defining opposed peripheral portions of said continuous bore over a portion of the length of said continuous bore.

6. In an arc welding machine in which consumable wire electrode is withdrawn from a source and pushed through a conduit to the welding arc by at least one pair of power-driven, opposed feed rolls, the combination with said feed rolls of guide means cooperating with said feed rolls to form a continuous bore to guide said electrode into said feed rolls and through said feed rolls to said conduit, said continuous bore being substantially square in cross-section with two side members forming two opposite sides of said bore, a portion of each said pair of feed rolls being disposed between said side members, the other two edges of said substantially square bore being formed by the serial arrangement of the opposed edges of a first pair of spacer members, the opposed traction surfaces of said pair of feed rolls, the opposed edges of a pair of spring-loaded pivotal members biased into contiguity with respective ones of said traction surfaces of said pair of feed rolls, and the opposed edges of a second pair of spacer members.

7. The combination defined in claim 6 wherein the height or width of said substantially square bore are no greater than twice the diameter of said electrode.

References Cited by the Examiner

UNITED STATES PATENTS

| | | | |
|---|---|---|---|
| 364,778 | 6/1887 | Seymour | 226—181 X |
| 2,347,639 | 4/1944 | Platt | 226—187 X |
| 2,754,958 | 7/1956 | Murrell et al. | 226—187 X |
| 3,172,991 | 3/1965 | Arnoldy | 219—130 |

FOREIGN PATENTS

| | | |
|---|---|---|
| 150,674 | 4/1904 | Germany. |

M. HENSON WOOD, JR., *Primary Examiner.*

A. N. KNOWLES, *Assistant Examiner.*